United States Patent
Cornic et al.

(12) 
(10) Patent No.: US 11,249,166 B2
(45) Date of Patent: Feb. 15, 2022

(54) METHOD AND SYSTEM FOR DETERMINING AN ANGLE OF ARRIVAL OF A RADIOELECTRIC SIGNAL

(71) Applicant: THALES, Courbevoie (FR)

(72) Inventors: Pascal Cornic, Brest (FR); Nicolas Porez, Merignac (FR); Patrick Garrec, Merignac (FR)

(73) Assignee: THALES, Courbevoie (FR)

( * ) Notice: Subject to any disclaimer, the term of this patent is extended or adjusted under 35 U.S.C. 154(b) by 298 days.

(21) Appl. No.: 16/450,645

(22) Filed: Jun. 24, 2019

(65) Prior Publication Data

US 2019/0391225 A1 Dec. 26, 2019

(30) Foreign Application Priority Data

Jun. 26, 2018 (FR) ...................................... 18 00658

(51) Int. Cl.
*G01S 3/48* (2006.01)
*G01S 3/60* (2006.01)
*G01S 5/12* (2006.01)

(52) U.S. Cl.
CPC ........ *G01S 3/48* (2013.01); *G01S 3/60* (2013.01); *G01S 5/12* (2013.01)

(58) Field of Classification Search
None
See application file for complete search history.

(56) References Cited

U.S. PATENT DOCUMENTS

2018/0038934 A1 2/2018 Passler et al.

FOREIGN PATENT DOCUMENTS

JP 61-48780 A 3/1986
JP 4-279877 A 10/1992

OTHER PUBLICATIONS

JPS6148780 translation (Year: 1986).*
French Search Report, from the French Patent Office in counterpart of French Application No. 1800658, dated May 20, 2019.
French Written Opinion, from the French Patent Office in couterpart of French Application No. 1800658, dated Jun. 26, 2018.

* cited by examiner

*Primary Examiner* — Whitney Moore
(74) *Attorney, Agent, or Firm* — Arent Fox LLP (57) ABSTRACT

The invention relates to a method for determining an angle of arrival of a received radioelectric signal implemented by a receiving antenna system including either one rotating antenna having at least two receiving channels, or two rotating antennas with a same speed each having a receiving channel, and having different antenna diagrams. The method includes calculating and storing a series of ambiguous angle error measurement values obtained from receiving amplitude values of a radioelectric signal coming from an emitting source on said first and second receiving channels, calculating a convolution function on said angular range tween said series of ambiguous angle error measurement values and a series of theoretical angle error measurement values of said receiving channels previously calculated and stored, and determining an angle of arrival of said received radioelectric signal as a function of an estimate of a maximum of said calculated convolution function.

9 Claims, 8 Drawing Sheets

METHOD AND SYSTEM FOR DETERMINING AN ANGLE OF ARRIVAL OF A RADIOELECTRIC SIGNAL

CROSS-REFERENCE TO RELATED APPLICATIONS

This application claims priority to French Patent Application No. 18 00658, filed on Jun. 26, 2018. The disclosure of the priority application is incorporated in its entirety herein by reference.

FIELD OF THE INVENTION

The present invention relates to a method and system for determining an angle of arrival of a received radioelectric signal implemented by a rotating antenna receiving system.

The invention falls within the field of the location of radioelectric emission sources by specialized equipment equipped with receiving antennas, for example by passive radars.

It is particularly applicable in the field of the detection of radioelectric emissions by detector equipment on board mobile platforms, for example aircraft or ships, but also applies to specialized equipment in detecting radioelectric signals on the ground.

BACKGROUND OF THE INVENTION

In these types of applications, it is known to use high-gain radar antennas, which are directional, in order to listen to radioelectric signals, and to rotate such antennas.

One particular problem arises for the determination of a direction of arrival of a radioelectric signal by one or several directional rotating antennas, also called scanners, the direction of arrival being defined by an angle of arrival relative to a reference direction, the radioelectric signal in turn being emitted by an emitting scanner.

In such a situation, in light of the sensitivity and the high dynamic of the detection equipment, it is possible to detect a radioelectric signal while the receiving scanner is not pointed toward the direction of the emitter of the radioelectric signal.

Indeed, in the case where the emitting antenna has a maximum gain greater than that of the receiving antenna, the maximum power captured on a receiving antenna tower can be obtained by reception in one of the side or diffuse lobes of the receiving antenna, when the emitting antenna is pointed toward the receiving antenna.

Known in the state of the art is a method called side lobe suppression method or SLS method. In such a method, an omnidirectional or lowly directive auxiliary antenna is added, in addition to the main directive antenna, to reject the radioelectric signals received by the main antenna via its side lobes. However, SLS methods are not effective in the case where the maximum power detection in reception is located in the diffuse lobes and not in the side lobes of the antenna diagram of the receiving antenna.

In a known manner, an antenna diagram includes a main lobe centered on the radioelectric axis of the antenna, surrounded by side lobes, then diffuse lobes that are further from the radioelectric axis than the side lobes.

Methods are also known that are based on the use of a rotating receiving antenna whereof the receiving speed is very different from the speed of rotation of the emitting antenna. But in this case, the choice of a much higher rotation speed in reception limits the likelihood of interception of the radioelectric signal. Conversely, the use of a rotation speed in reception much lower than the speed of the transmitting antenna causes processing slowness in the angular reception range.

Lastly, it is known to use an antenna of the phase or amplitude monopulse type, which has two reception channels, respectively called sum channel and difference channel, each reception channel having an associated antenna diagram, the antenna diagrams of the sum and difference channels being orthogonal. Such an antenna allows an unambiguous measurement of the angle of arrival of a radioelectric signal in a range limited to the opening of the antenna of the sum channel. However, outside this angular range, the angle of arrival measurements are ambiguous.

The invention aims to resolve the aforementioned drawbacks of the state of the art, and to propose a method for unambiguously determining an angle of arrival of a received radioelectric signal implemented by a rotating receiving antenna system, over an extended angular range.

SUMMARY OF THE INVENTION

To that end, according to an aspect, the invention proposes a method for determining an angle of arrival of a received radioelectric signal implemented by a receiving antenna system including either one rotating antenna having at least two receiving channels, or two rotating antennas with a same rotation speed each having a receiving channel, a first receiving channel having a first antenna diagram and a second receiving channel having a second antenna diagram, said first and second antenna diagrams being different.

This method includes, in the operational phase, the following steps:
  calculating and storing a series of ambiguous angle error measurement values obtained from receiving amplitude values of a radioelectric signal coming from an emitting source on said first and second receiving channels, said radioelectric signal being received on said first and second receiving channels by the rotating antenna(s) over a predetermined angular range, each angle error measurement value being representative of a ratio between receiving amplitude values on said first and second receiving channels, and corresponding to an angular deviation relative to a reference angular value;
  calculating a convolution function on said angular range tween said series of ambiguous angle error measurement values and a series of theoretical angle error measurement values of said receiving channels previously calculated and stored,
  determining an angle of arrival of said received radioelectric signal as a function of an estimate of a maximum of said calculated convolution function.

Advantageously, the inventive method uses a convolution between theoretical angle error measurement values previously calculated and estimated ambiguous angle error measurement values in reception over a predetermined angle error measurement range to determine the angle of arrival of the received radioelectric signal.

Advantageously, the inventive method makes it possible to remove angle of arrival ambiguities over an extended angular range, and works in the case of an emitting antenna that is also rotating.

The method for determining an angle arrival of a radioelectric signal according to the invention may have one or more of the features below, considered independently or in combination, according to all technically acceptable combinations.

It includes, before calculating and storing a series of ambiguous angle error measurement values, a step for detecting and separating received radioelectric signals by emitting source.

The calculation of a series of ambiguous angle error measurement values includes:
  obtaining receiving amplitude values on said first and second receiving channels, each amplitude value being associated with an angular value;
  for the first receiving channel, for each angular value, calculating a so-called synthetic receiving amplitude, equal to the maximum between the receiving amplitude value on the first receiving channel and receiving amplitude value on the second receiving channel;
  for each angular value, calculating an angle error measurement value by obtaining the ratio between the receiving amplitude value on the second receiving channel and the corresponding synthetic receiving amplitude value.

The series of theoretical angle error measurement values of said receiving channels includes a number of values corresponding to a predetermined angular sampling pitch, the method further including, before calculating a convolution function, a step for re-sampling ambiguous angle error measurement values to obtain a series of ambiguous angle error measurement values of equal angular sampling pitch and of same number of values as said series of theoretical angle error measurement values.

The method includes a first phase for calculating and storing said theoretical angle error measurement values for said receiving channels.

The first phase includes the following steps:
  taking receiving amplitude measurements on each of the receiving channels for a plurality of angular values, of predetermined angular pitch, to obtain said first antenna diagram and second antenna diagram,
  processing the first antenna diagram to obtain a synthetic antenna diagram, each amplitude value of the synthetic antenna diagram corresponding to a given angular value being equal to the maximum between the value of the first antenna diagram and the amplitude value of the second antenna diagram corresponding to said angular value.

It further includes calculating theoretical angle error measurement values consisting of calculating, for each angular value, the ratio between the amplitude value of the second antenna diagram corresponding to said angular value and the amplitude value of said synthetic antenna diagram corresponding to said angular value.

Each antenna diagram includes a main lobe centered on a radioelectric axis of the antenna, two secondary lobes, surrounding said main lobe and diffuse lobes surrounding said secondary lobes, said angular range being chosen so as to comprise said main lobe, said secondary lobes and at least one diffuse lobe on either side of the radioelectric axis of the antenna.

According to another aspect, the invention proposes a system for determining an angle of arrival of a received radioelectric signal, including a receiving antenna system including either one rotating antenna having at least two receiving channels, or two rotating antennas with a same rotation speed each having a receiving channel, a first receiving channel having a first antenna diagram and a second receiving channel having a second antenna diagram, said first and second antenna diagrams being different, said first and second receiving channels being connected to an electronic computing device including at least one processor suitable for implementing modules capable of:
  calculating and storing a series of ambiguous angle error measurement values obtained from receiving amplitude values of a radioelectric signal coming from an emitting source on said first and second receiving channels, said radioelectric signal being received on said first and second receiving channels by the rotating antenna(s) over a predetermined angular range, each angle error measurement value being representative of a ratio between receiving amplitude values on said first and second receiving channels, and corresponding to an angular deviation relative to a reference angular value;
  calculating a convolution function on said angular range tween said series of ambiguous angle error measurement values and a series of theoretical angle error measurement values of said receiving channels previously calculated and stored,
  determining an angle of arrival of said received radioelectric signal as a function of an estimate of a maximum of said calculated convolution function.

BRIEF DESCRIPTION OF THE DRAWINGS

Other features and advantages of the invention will emerge from the description thereof provided below, for information and non-limitingly, in reference to the appended figures, in which.

DETAILED DESCRIPTION OF EMBODIMENTS

The invention in particular applies to passive detection equipment for radioelectric signals, for example radars, including an antenna system with rotating antenna(s), also called scanner(s), with two receiving channels.

Figure 1:
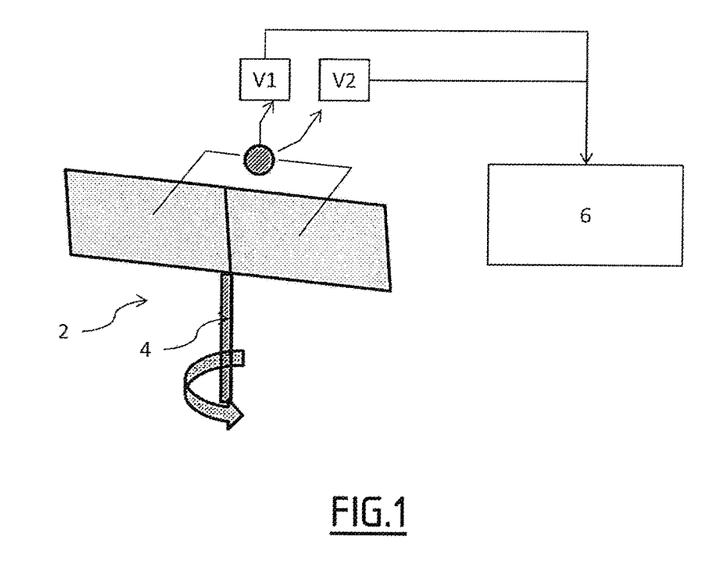
FIG. 1 is a schematic illustration of an antenna system including a rotating antenna with two receiving channels.

In one embodiment, illustrated schematically in FIG. 1, the antenna system includes a receiving antenna 2 of the monopulse type with two receiving channels, respectively a first receiving channel V1 and a second receiving channel V2. The first receiving channel is also called sum channel and the second receiving channel is called difference channel, and these channels have orthogonal antenna diagrams.

According to an embodiment variant, the antenna system used is a system with two scanners, which, during operation, are rotated at the same angular speed, and have different antenna diagrams, the difference between the maximum values of these diagrams typically being about 10 dB or more, as illustrated hereinafter by the exemplary antenna diagrams of FIG. 3.

In a known manner, an antenna diagram is a representation of an angular distribution of a characteristic property of the antenna radiation, for example the power of the received radioelectric signal, over a given angular range, for example over a complete range of from −180° to 180° or over an angular range restricted to an interval [−Θ,Θ], for example from −60° to +60° on either side of the radioelectric axis of the antenna corresponding to the zero degrees axis.

Figure 2:
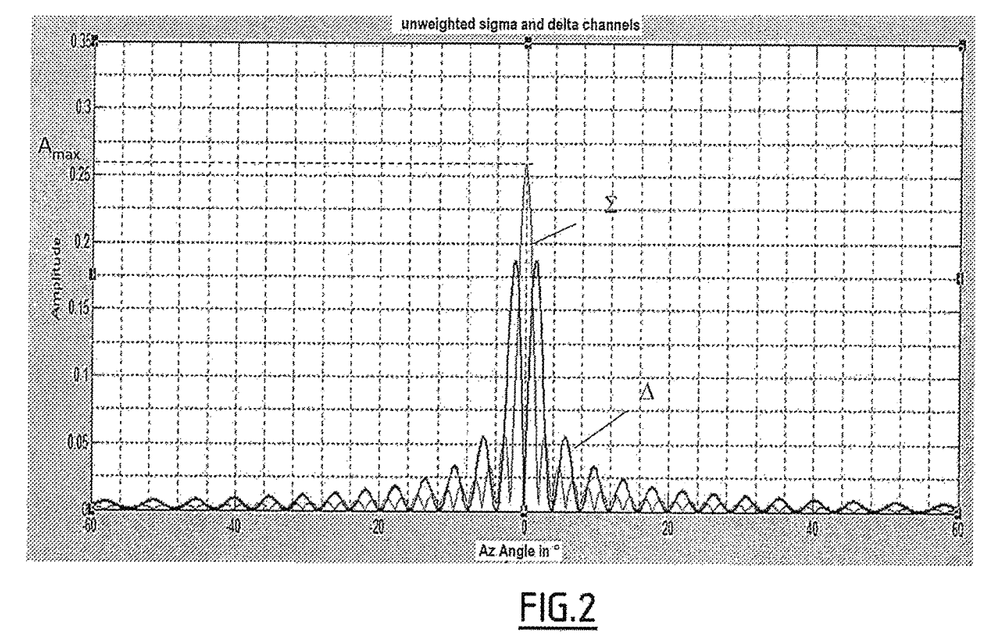
FIG. 2 is a first example of antenna diagrams of a first and a second receiving channel.

The terminology "orthogonal antenna diagrams" refers to antenna diagrams as illustrated in the example illustrated in FIG. 2.

Indeed, FIG. 2 comprises examples of amplitude diagrams as a function of the rotation angle of the antenna in the horizontal plane, also called azimuth angle: a first antenna diagram Σ of the first receiving channel (sum channel) and a second antenna diagram Δ of the second receiving channel (difference channel). These diagrams are shown in a planar orthogonal coordinate system, the x-axis representing the azimuth angle in degrees and the y-axis representing the received power amplitude.

For these diagrams, when the power amplitude of the received signal is maximal on one of the channels (the difference channel in the example of FIG. 2), it is minimal on the other channel (the sum channel in the example).

According to a mathematical definition, two antenna diagrams are orthogonal when the scalar product of the power vectors of the two channels, over the entire considered angular range, is nil, which is written:

$$\sum_{\theta=-180}^{\theta=+180} \overrightarrow{\Sigma(\theta)} \cdot \overrightarrow{\Delta(\theta)} = 0$$

Figure 3:
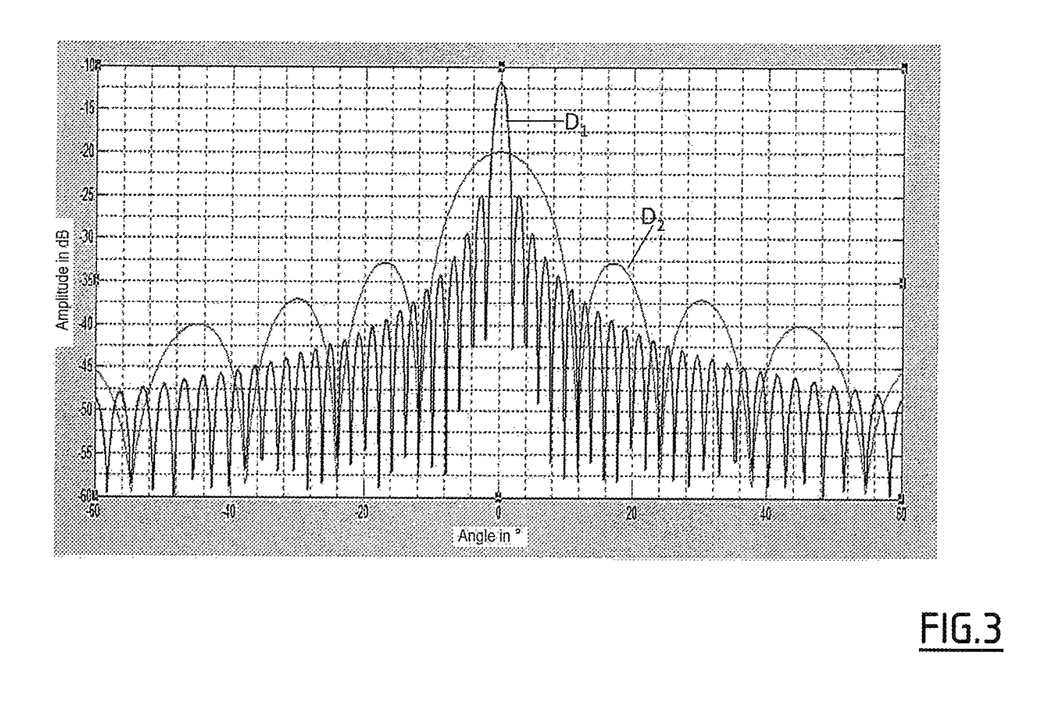
FIG. 3 is a second example of antenna diagrams of a first and a second receiving channel.

The scalar product accounts for the phase and the amplitude, only the amplitude being shown in the examples of FIGS. 2 and 3.

As illustrated in FIG. 2, the antenna diagram Σ of the first receiving channel has an amplitude maximum $A_{max}$ at the angle 0°, corresponding to the radioelectric axis of the antenna, and the diagram Δ of the second receiving channel is at the minimum (0 amplitude) at 0°.

FIG. 3 schematically illustrates two amplitude diagrams as a function of the rotation angle of the antenna in the horizontal plane, in the case of two antennas each having a receiving channel, the antenna diagrams being different, as illustrated.

The antenna 2 is suitable for rotating about a rotation axis 4, at an angular rotation speed Ω in degrees per second, for example over an angular range of 360° in azimuth.

The antenna 2 for example has an angular opening of about 1 to 5 degrees in azimuth, and from several degrees to several tens of degrees in elevation.

To determine the direction of arrival of the radioelectric signals, the outputs of the receiving channels V1 and V2, during operational or simulated operation, are connected to a computing device 6.

The computing device 6 is a programmable electronic device, for example a computer, or an electronic device made in the form of programmable logic components, such as an FPGA (Field-Programmable Gate Array), or in the form of dedicated integrated circuits of the ASIC (Application-Specific Integrated Circuit) type.

Figure 4:
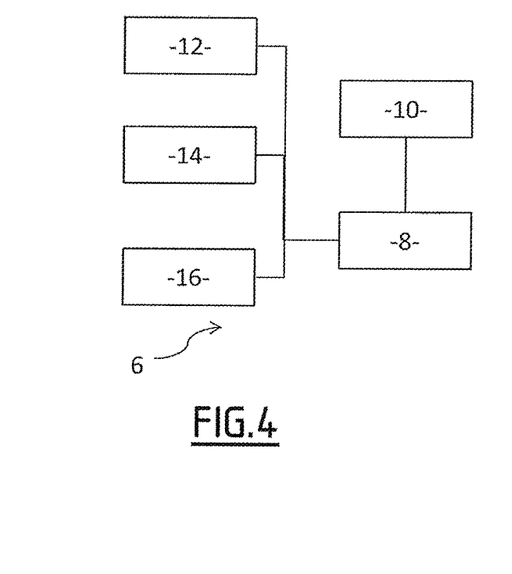
FIG. 4 is a block diagram of a computing device suitable for carrying out steps of the inventive method according to one embodiment.

FIG. 4 schematically illustrates the main functional blocks of a computing device 6 suitable for carrying out the steps of the described method for determining angle of arrival.

The computing device 6 comprises a central processing unit 8, or CPU, including one or several electronic processors, suitable for executing computer program instructions when the device 6 is powered on.

The device 6 also includes an electronic memory unit 10 suitable for storing information, in particular registers. In particular, executable code instructions able to carry out the method for determining radioelectric signal angle of arrival according to the invention are stored.

The device 6 includes a command interface 12 making it possible to update parameters and to receive commands from an operator.

Optionally, the device 6 comprises a screen 14 and an additional pointing means 16, such as a mouse.

The various functional blocks of the device 6 described above are connected via a communication bus 18.

Figure 5:
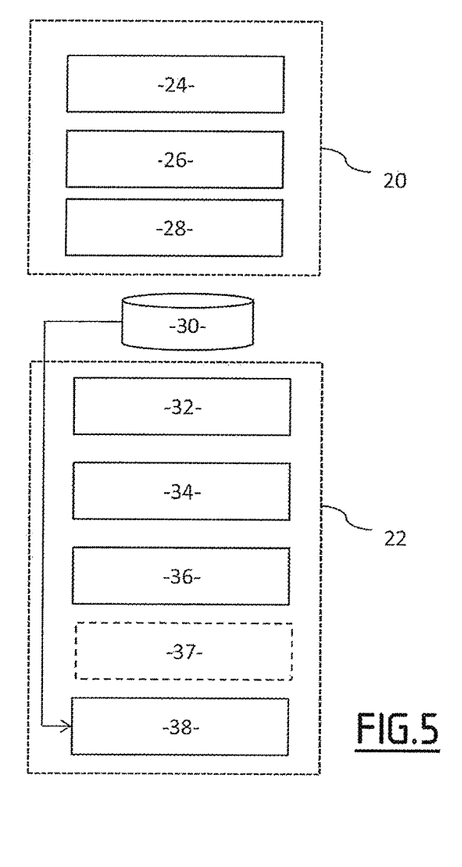
FIG. 5 is a block diagram of the main steps of a method for determining angle of arrival according to one embodiment of the invention.

FIG. 5 is a block diagram of the main steps of a method for determining angle of arrival of a radioelectric signal according to one embodiment of the invention.

Some steps of this method, as indicated below, are carried out, in one embodiment, in the form of software code modules, including computer program code instructions.

A method for determining angle of arrival according to the invention includes, in the embodiment described hereinafter, a first phase 20 and a second phase 22, the first phase 20 being carried out before the commissioning of an antenna system as described above, and the second phase 22 being carried out in the operational phase.

The steps described hereinafter and carried out in the form of software modules are, in this case, implemented as separate computing modules.

The first phase 20 is for example carried out during the manufacturing of the antenna(s), in the factory.

In the first phase 20, the method includes a first step 24 for characterization of the first and second receiving channels, over a predetermined angular range, for example of +/−60° around the radioelectric axis of the antenna.

More generally, the angular range [−Θ, Θ] is chosen so as to include the main antenna lobe, the side lobes, also called secondary lobes, and at least two diffuse lobes located after the side lobes with respect to the main lobe. In one embodiment, the angular range is determined at the same time as the characterization of the antenna diagrams in amplitude, which are initially drawn over the complete angular range, from −180° to 180° around the radioelectric axis.

The characterization step 24 includes reading received signal power amplitude measurements done for example in an anechoic chamber, on each of the receiving channels, using methods known by one skilled in the art, and storing read measurements in an electronic memory unit of a computing device as described above. In this phase, the tested receiving antenna is in a fixed position, and the relative angle between the source emitting a radioelectric signal and the tested receiving antenna is known.

Antenna diagrams as illustrated in FIGS. 2 and 3 are obtained.

Step 24 is followed by a step 26 for processing of the stored antenna diagrams.

Step 26 includes computing a so-called synthetic antenna diagram, or without side lobes, associated with the first receiving channel.

In the case where one has a first antenna diagram $\Sigma$ of the first receiving channel (sum channel) and a second antenna diagram $\Delta$ of the second receiving channel (difference channel), the first antenna diagram $\Sigma$ of the first channel is replaced by a first synthetic diagram denoted $\Sigma_{SLS}$ formed by retaining the maximum value, for each angular value, of the first and second antenna diagrams.

In other words, if the amplitude value of the second diagram $\Delta(\theta)$ is greater than the value $\sigma(\theta)$ for a given value of $\theta$, then $\Sigma_{SLS}(\theta) = \Delta(\theta)$.

In the general case of an antenna system, one chooses one of the receiving channels as first receiving channel and applies the processing indicated above in order to obtain the synthetic antenna diagram associated with the first receiving channel.

Optionally, a weight is applied on the first antenna diagram of the sum channel before computing the synthetic diagram.

The weighting is done such that the antenna receives the radiation according to a nonuniform electrical field illumination law, the received field being maximal at the center of the antenna and decreasing gradually moving away from the center. The goal is to reduce the side lobes of the sum channel. The typical example is the Gaussian illumination.

On a continuous antenna, one obtains this effect for example by placing the illumination horns at the focus of a parabola, such that the illumination of the horns on the parabola is maximal at the center of the parabola and decreases moving away from the center.

On an antenna with active modules, the modules at the center of the antenna will have a maximal gain at the center of the antenna and those on the border of the antenna will have the lowest gain. The antenna gain is for example adjusted over several gain levels, for example equal to 3, the gain levels decreasing between the antenna center and the antenna border.

Lastly, during a following step 28, theoretical angle error measurement values are calculated, and stored in the form of series of values in a storage unit 30. Each calculated theoretical angle error measurement is associated with an angular value.

In one embodiment, these theoretical angle error measurement values are stored in a file, which in turn can be stored on any type of non-volatile, computer-readable electronic medium.

The theoretical angle error measurement values are computed from the ratio of the antenna diagrams between the diagram of the difference channel and the synthetic diagram of the sum channel, as a function of an angular value: $E(\theta) = \Delta(\theta)/E_{SLS}(\theta)$. In the general case of an antenna system with two antennas, the theoretical angle error measurement values are computed from the ratio of the antenna diagrams between the diagram of the second channel (D2) and the synthetic diagram of the first channel, as a function of an angular value according to the formula: $E(\theta) = D_2(\theta)/D_{1SLS}(\theta)$.

The angle error measurement values are computed for a given angular sampling pitch (or sampling rate) $\delta\theta$ over the considered angular range: $\{E(\theta_j), -\Theta \leq \theta_j \leq \Theta\}$ and $\theta_{j+1} = \theta_j + \delta\theta$.

In one embodiment, the given angular sampling pitch is chosen as a function of the rotation speed $\Omega$ of the receiving antenna(s), expressed in degrees per second, so as to guarantee a number N of successive detections during an antenna lobe passage. Preferably, N is greater than or equal to 10.

For a lobe width of $\Delta\Theta$ in degrees, the lobe passage time is given by:

$T = \Delta\Theta/\Omega$

The maximum repetition period of the signals to be detected being Tr_max, one can choose: N=T/Tr_max.

The actual repetition period of the signals to be detected is not known, but it is less than or equal to Tr_max.

In an embodiment variant, if several applications are provided, several theoretical angle error measurement models, with several different angular sampling pitches, are computed and stored.

Figure 6:
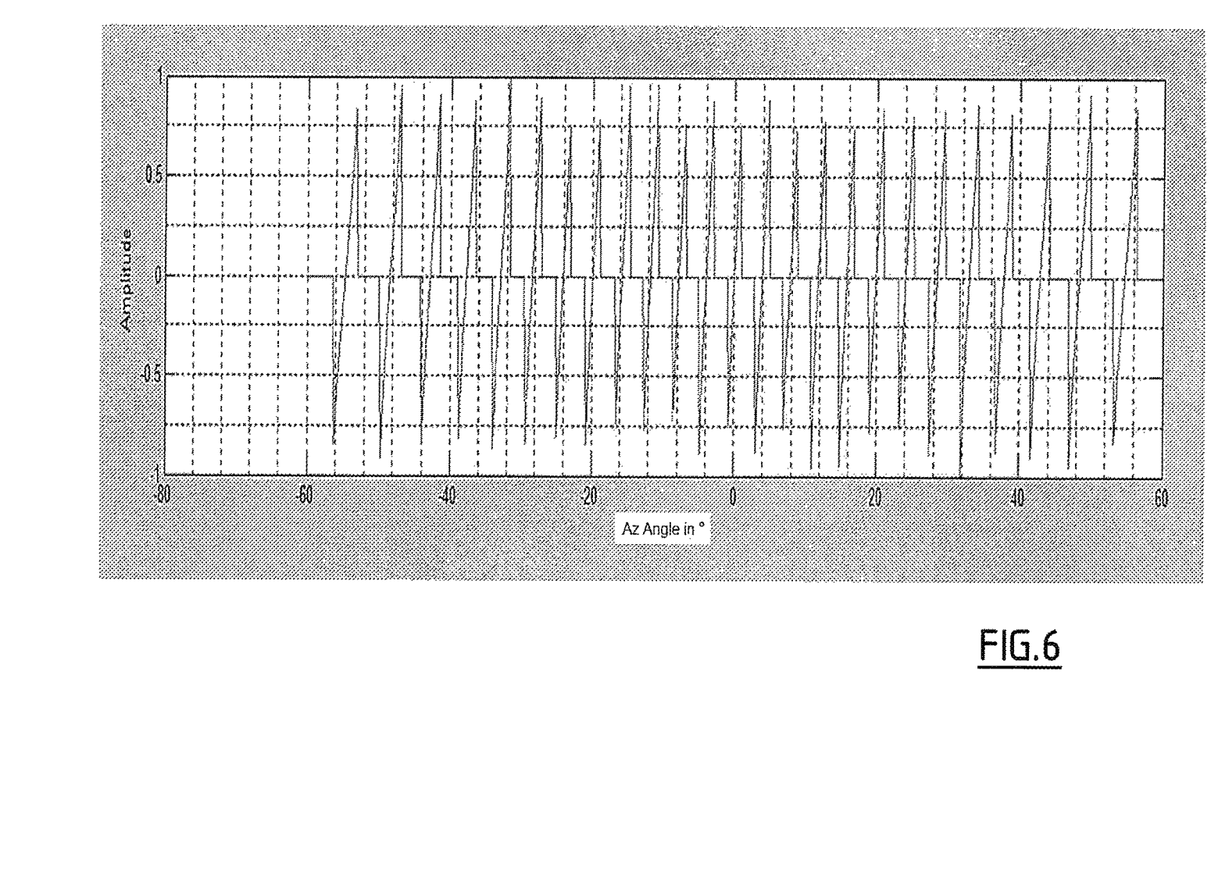
FIG. 6 is a first example of a theoretical model of angle error measurement in a given angular range for a monopulse-type antenna.
Figure 7:
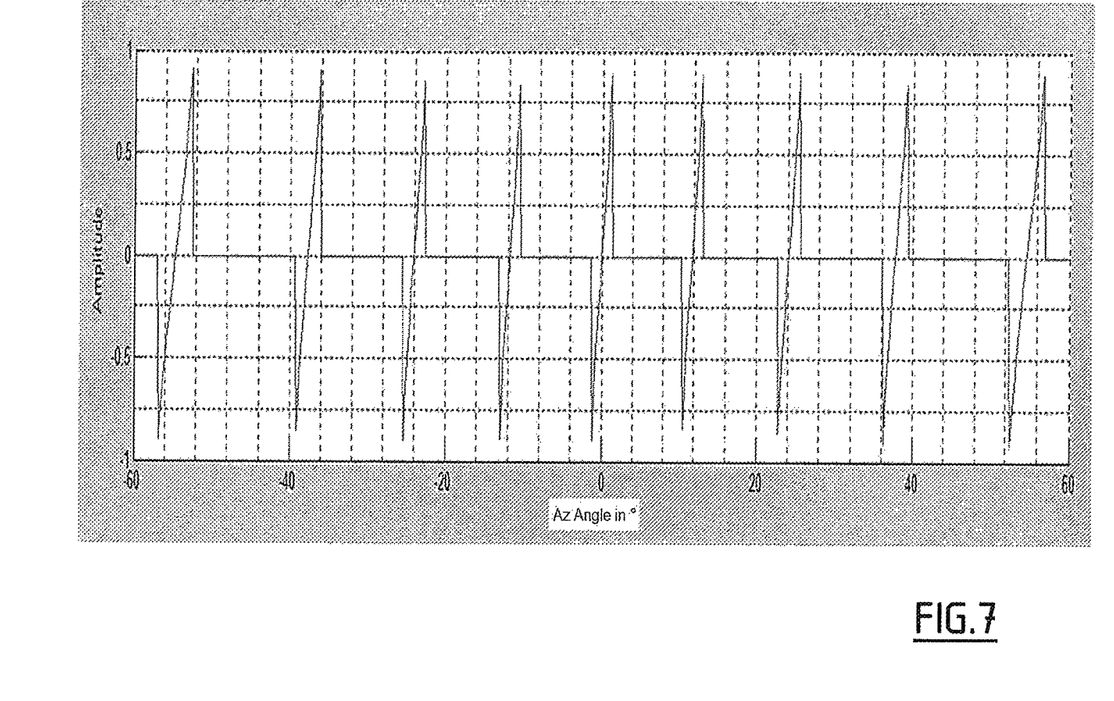
FIG. 7 is a second example of a theoretical model of angle error measurement in a given angular range for a monopulse-type antenna.

FIG. 6 illustrates an example theoretical angle error measurement model computed without weighting, and FIG. 7 illustrates an example theoretical angle error measurement model calculated for an antenna with weighting on 3 antenna gain levels.

It clearly emerges from FIGS. 6 and 7 that the angle error measurement models are ambiguous, because several angle values correspond to a given angle error measurement value in the interval $[-1,1]$, even if the weighting reduces this ambiguity.

For a given antenna, the angle error measurement values of the theoretical angle error measurement model, computed and stored beforehand, are provided as input for the second phase 22 carried out in operational operation.

For example, a scanner is considered of the monopulse type with two receiving channels as described in reference to FIG. 1, which receives radioelectric signals from at least one emitting source, which in turn rotates.

The first step 32 of the second phase 22 of the method is a step for initializing parameters, in particular values defining the considered angular range and the angular sampling pitch to be applied, and if applicable, a weighting to be applied.

A following step 34 for detecting and separating radioelectric signals as a function of the emitting source is carried out. Indeed, in a practical application context, a same piece of receiving equipment is able to receive radioelectric signals coming from several emitting sources, located in different spatial locations.

During this step 34, characteristics such as the time of arrival, the pulse duration, the frequency and the amplitude are estimated, using methods known by those skilled in the art. These characteristics are used to group together the signals able to correspond to a same emitter.

Furthermore, as an optional addition to these known methods, angle error measurement values of the radioelectric signals respectively received on the first receiving channel and the second receiving channel are computed. Thus, it is also possible to add a criterion for grouping together receptions having close angle error measurement values.

Next, the radioelectric signal receptions coming, according to the estimate of step 34, from a same emission source are processed.

The radioelectric signal power amplitudes received on each of the first and second channels are stored, next making it possible to compute and store, in step 36, corresponding angle error measurement values, which are ambiguous, as explained above.

These ambiguous angle error measurement values are computed from the ratio, for a detection of rank k, corresponding to an angular position $\theta_k$, by the ratio between receiving amplitude values on the second channel to the receiving amplitude value after SLS processing on the first channel, corresponding to the formula previously given: $E\_mes(\theta_k) = \Delta(\theta_k)/\Sigma_{SLS}(\theta_k)$.

In the general case of an antenna system with two antennas, a first receiving channel and a second receiving channel are chosen, and a similar formula is applied to compute the ambiguous angle error measurement values.

The angular value $\theta_k$ is expressed as a deviation with respect to relative to a reference angular value $\theta_0$ corresponding to the direction of arrival angle of the first direction:

$$\theta_k = \theta_0 + \sum_{i=1}^{k} \Omega Tr(i)$$

Where $\Omega Tr(i)$ is the angular variation between the detection of rank i and the detection of rank (i−1). In this formula, $\Omega$ is the angular rotation speed of the antenna, in degrees per second, and Tr(i) is the time between successive detections of rank (i−1) and i. The value Tr(i) is or is not constant.

The angle $\theta_0$, angular reference value, is unknown at this stage, the angle error measurement values are referenced relative to a fixed value chosen in the detection range, for example $\theta_0 = -\Theta$, first value of the interval defining the selected angular range.

The series of computed ambiguous angle error measurement values is stored.

For example, these values are stored in an offset register-type memory, which is refreshed upon each new detection.

If applicable, the same antenna weighting is applied for the detection in the operational phase as that applied previously to compute the theoretical angle error measurement values.

Next, during a step 38 for determining angle of arrival, a discrete convolution function is computed on the considered angular range, between the series of theoretical angle error measurement values previously computed and stored and the series of ambiguous angle error measurement values obtained in step 36, and the angular value $\theta_{dir}$ corresponding to the maximum of the convolution function is determined.

The value $\theta_{dir}$ thus obtained corresponds to the angle of the direction of arrival of the received radioelectric signal relative to the angular position $\theta_0$ of the receiving antenna during the first detection.

It should be noted that, in one embodiment, the method includes an optional step 37, consisting of resampling the ambiguous angle error measurement values obtained in step 36, according to the angular sampling pitch $\delta\theta$ used to compute the theoretical angle error measurement model, so as to obtain a series of ambiguous angle error measurement values with the same number of values corresponding to a same angular sampling pitch $\delta\theta$ as the series of theoretical angle error measurement values.

Any method known by one skilled in the art, for example an interpolation method, can be used to that end.

One then obtains, upon entering step 38 for effectively determining the value of the angle of arrival, on the one hand, the set of theoretical angle error measurement values previously computed and stored: $\{E_j, 0 \leq j \leq M-1\}$, where each $E_j$ corresponds to a known angular value, and a set of ambiguous angle error measurement values obtained by operational phase measurement: $\{E_{mes\_k}, 0 \leq k \leq M-1\}$, each $E_{mes\_k}$ corresponding to a known angular value relative to a reference value $\theta_0$ as explained above.

The number M is the number of successive detections of signals coming from the same emitter in a given angular range, much larger than a single antenna lobe, for example between −60° and +60°.

Figure 8:
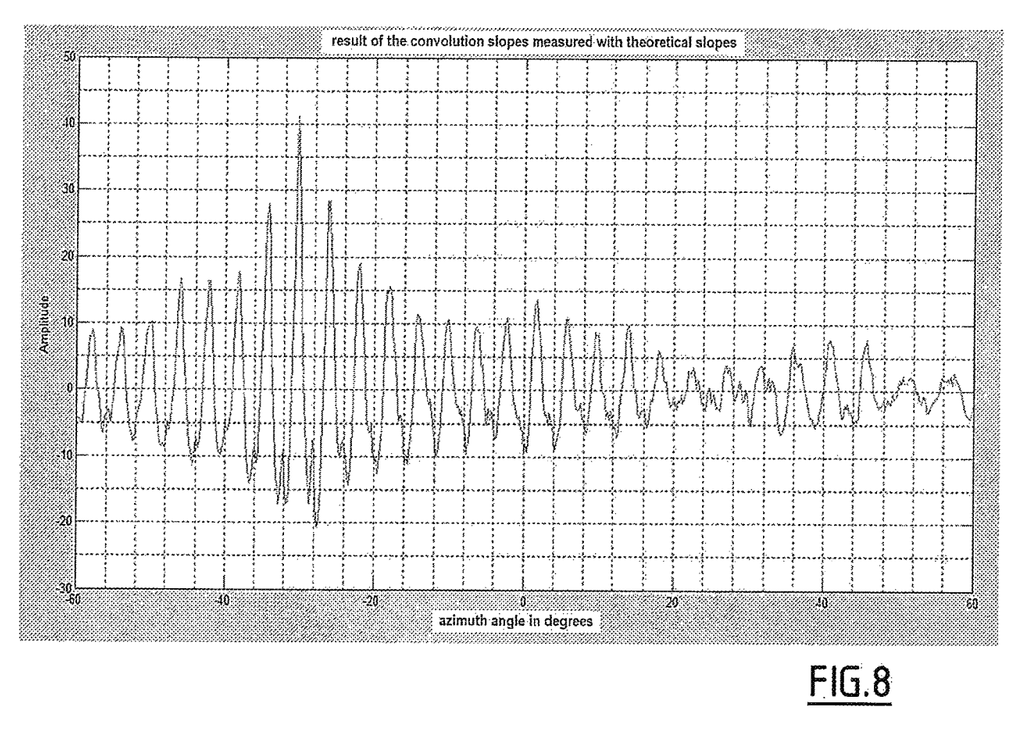
FIG. 8 is a first example of calculated convolution function.
Figure 9:
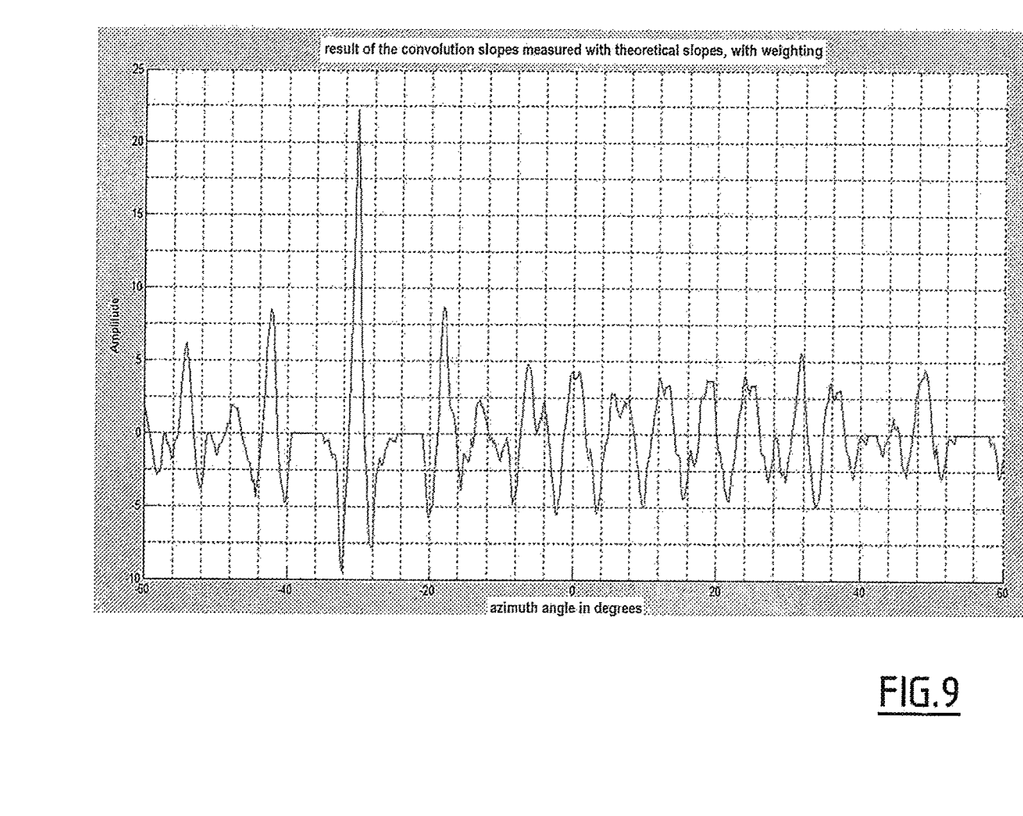
FIG. 9 is a second example of calculated convolution function.

FIGS. 8 and 9 illustrate examples of convolution functions FC1 and FC2, over the considered angular range, computed in step 38, respectively without applying a weighting coefficient—function FC1, FIG. 8 and with the application of a weighting coefficient equal to 3—function FC2, FIG. 9.

In both examples, the maximum of the convolution function clearly stands out, and it is easy to obtain the corresponding angular value $\theta_{dir}$, which is about −30° in this example.

The invention claimed is:

1. A method for determining an angle of arrival of a received radioelectric signal implemented by a receiving antenna system including either one rotating antenna having at least two receiving channels, or two rotating antennas with a same rotation speed each having a receiving channel,
a first receiving channel having a first antenna diagram and a second receiving channel having a second antenna diagram, said first and second antenna diagrams being different,
comprising, in an operational phase:
calculating and storing a series of ambiguous angle error measurement values obtained from receiving amplitude values of a radioelectric signal coming from an emitting source on said first and second receiving channels, said radioelectric signal being received on said first and second receiving channels by the one or two rotating antennas over a predetermined angular range, each angle error measurement value being representative of a ratio between receiving amplitude values on said first and second receiving channels, and corresponding to an angular deviation relative to a reference angular value,
wherein the calculation of a series of ambiguous angle error measurement values comprises:
obtaining receiving amplitude values on said first and second receiving channels, each amplitude value being associated with an angular value;
for the first receiving channel, for each angular value, calculating a so-called synthetic receiving amplitude value, equal to a maximum between the receiving amplitude value on the first receiving channel and the receiving amplitude value on the second receiving channel;
for each angular value, calculating an ambiguous angle error measurement value by obtaining the ratio between the receiving amplitude value on the second receiving channel and the corresponding synthetic receiving amplitude value;
the method further comprising:
calculating a convolution function on said angular range between said series of ambiguous angle error measurement values and a series of theoretical angle error measurement values of said receiving channels previously calculated and stored,
determining an angle of arrival of said received radioelectric signal as a function of an estimate of a maximum of said calculated convolution function.

2. The method according to claim 1, including, before calculating and storing a series of ambiguous angle error measurement values, detecting and separating received radioelectric signals by emitting source.

3. The method according to claim 1, wherein said series of theoretical angle error measurement values of said receiving channels includes a number of values corresponding to a predetermined angular sampling pitch, the method further including, before calculating a convolution function, resampling ambiguous angle error measurement values to obtain a series of ambiguous angle error measurement values of equal angular sampling pitch and of same number of values as said series of theoretical angle error measurement values.

4. The method according to claim 1, including a first phase for calculating and storing said theoretical angle error measurement values for said receiving channels.

5. The method according to claim 4, wherein said first phase comprises:
obtaining receiving amplitude measurements on each of the receiving channels for a plurality of angular values, of predetermined angular pitch, to obtain said first antenna diagram and second antenna diagram,
processing the first antenna diagram to obtain a synthetic antenna diagram, each amplitude value of the synthetic antenna diagram corresponding to a given angular value being equal to the maximum between the value of the first antenna diagram and the amplitude value of the second antenna diagram corresponding to said angular value.

6. The method according to claim 5, further comprising calculating theoretical angle error measurement values consisting of calculating, for each angular value, the ratio between the amplitude value of the second antenna diagram corresponding to said angular value and the amplitude value of said synthetic antenna diagram corresponding to said angular value.

7. The method according to claim 1, wherein each antenna diagram includes a main lobe centered on a radioelectric axis of the antenna, two secondary lobes surrounding said main lobe and diffuse lobes surrounding said secondary lobes, said angular range being chosen so as to comprise said main lobe, said secondary lobes and at least one diffuse lobe on either side of the radioelectric axis of the antenna.

8. The method according to claim 1, implemented in an antenna receiving system with a monopulse-type antenna including two receiving channels, the first receiving channel being a sum channel and the second receiving channel being a difference channel.

9. A system for determining an angle of arrival of a radioelectric signal, including either one rotating antenna having at least two receiving channels, or two rotating antennas with a same rotation speed each having a receiving channel,
a first receiving channel having a first antenna diagram and a second receiving channel having a second antenna diagram, said first and second antenna diagrams being different,
said first and second receiving channels being connected to an electronic computing device including at least one processor configured for:
calculating and storing a series of ambiguous angle error measurement values obtained from receiving amplitude values of a radioelectric signal coming from an emitting source on said first and second receiving channels, said radioelectric signal being received on said first and second receiving channels by the one or more rotating antennas over a predetermined angular range, each angle error measurement value being representative of a ratio between receiving amplitude values on said first and second receiving channels, and corresponding to an angular deviation relative to a reference angular value;
wherein the calculation of a series of ambiguous angle error measurement values comprises:
obtaining receiving amplitude values on said first and second receiving channels, each amplitude value being associated with an angular value;
for the first receiving channel, for each angular value, calculating a so-called synthetic receiving amplitude value, equal to a maximum between the receiving amplitude value on the first receiving channel and the receiving amplitude value on the second receiving channel;
for each angular value, calculating an ambiguous angle error measurement value by obtaining the ratio between the receiving amplitude value on the second receiving channel and the corresponding synthetic receiving amplitude value;
the processor further being suitable for implementing modules configured for:
calculating a convolution function on said angular range between said series of ambiguous angle error measurement values and a series of theoretical angle error measurement values of said receiving channels previously calculated and stored,
determining an angle of arrival of said received radioelectric signal as a function of an estimate of a maximum of said calculated convolution function.

* * * * *